(12) United States Patent  
Gottemoller et al.

(10) Patent No.: US 6,712,035 B2
(45) Date of Patent: Mar. 30, 2004

(54) DIESEL INJECTION IGNITER AND METHOD

(75) Inventors: Paul Gottemoller, Palos Park, IL (US); Richard Wayne Tupek, Naperville, IL (US); Michael Barry Goetzke, Orland Park, IL (US); Jerry Van Polen, Oak Park, IL (US); David Corba, Des Plaines, IL (US); Wojciech T. Pierga, Glenview, IL (US); Donald E. Meyer, Westchester, IL (US); Richard J. Lill, Naperville, IL (US); Hassan Z. Hannon, Chicago, IL (US)

(73) Assignee: General Motors Corporation, Detroit, MI (US)

( * ) Notice: Subject to any disclaimer, the term of this patent is extended or adjusted under 35 U.S.C. 154(b) by 172 days.

(21) Appl. No.: 10/106,745

(22) Filed: Mar. 26, 2002

(65) Prior Publication Data

US 2003/0183216 A1 Oct. 2, 2003

(51) Int. Cl.[7] ............................................. F02M 57/06
(52) U.S. Cl. ....................................... 123/297; 239/584
(58) Field of Search .................................. 123/297, 305, 123/146.5 R; 239/584

(56) References Cited

U.S. PATENT DOCUMENTS 5,377,633 A * 1/1995 Wakeman ..................... 123/297
5,522,357 A * 6/1996 Nogi et al. .................... 123/261

* cited by examiner

Primary Examiner—Bibhu Mohanty
(74) Attorney, Agent, or Firm—Cary W. Brooks

(57) ABSTRACT

Ignition delay in a diesel engine is reduced or eliminated by a fuel injector or igniter nozzle which includes energy supplying fuel conditioning means at the point of fuel injection into a cylinder. A preferred embodiment includes an electrically-conductive injection valve reciprocable in a conductive nozzle body and seatable on a valve seat to stop fuel flow through nozzle orifices. The injection valve is electrically insulated from the body except at its contact with the valve seat and is connected to an electrical charge, at least during opening of the valve. An electrical spark discharge is thus generated between the injection valve and the valve seat upon opening of the valve. Initially injected fuel passes through the arc and is conditioned by the spark energy to ignite almost immediately by compression ignition upon entering the engine cylinder and thus essentially eliminate diesel ignition delay.

8 Claims, 1 Drawing Sheet

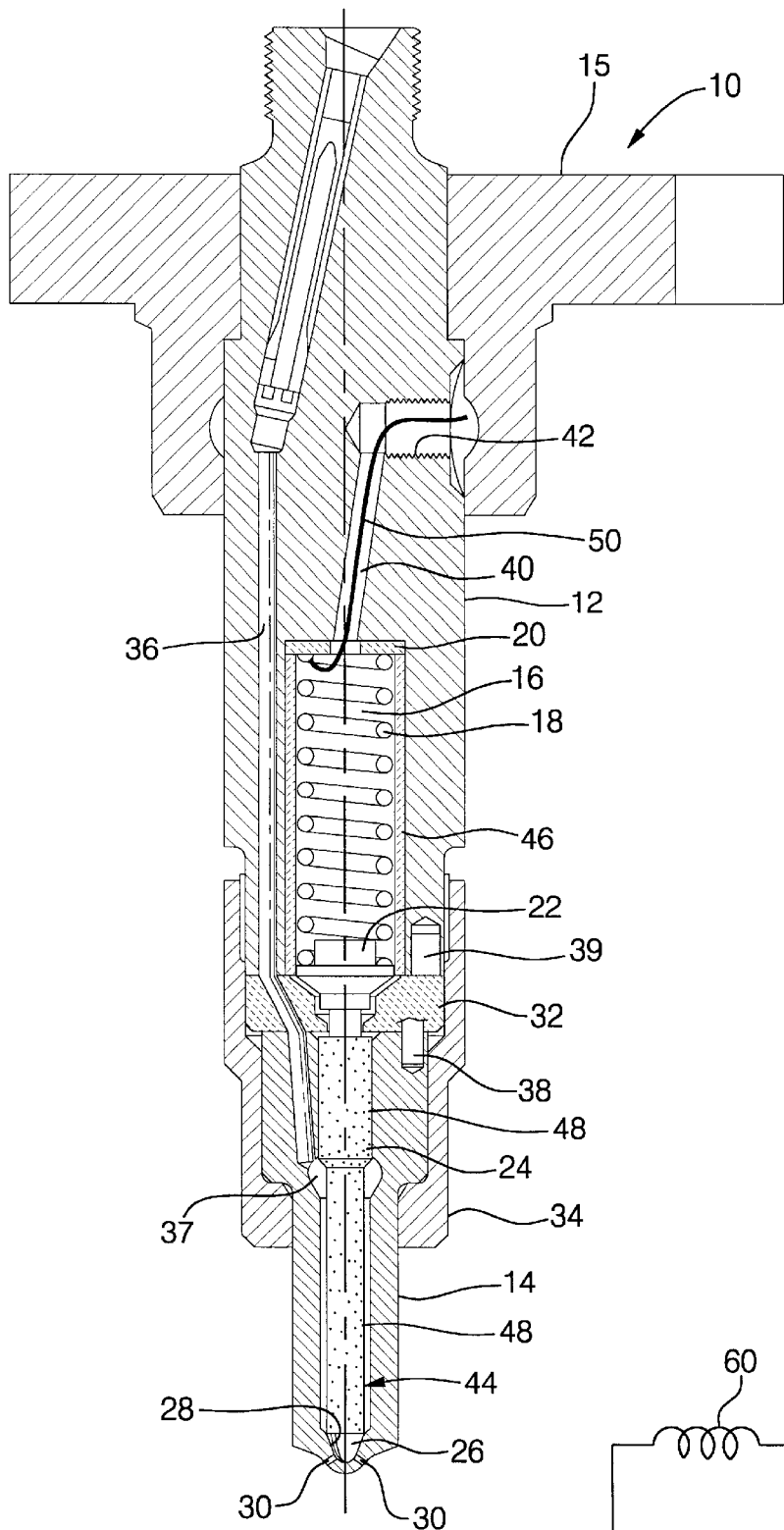
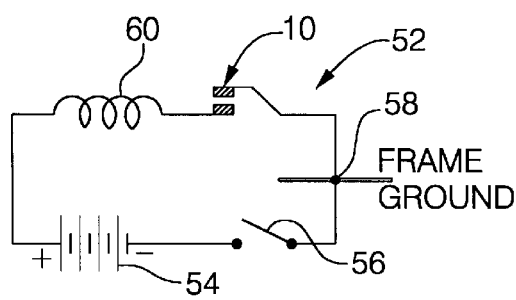
FIG. 1
FIG. 2

DIESEL INJECTION IGNITER AND METHOD

TECHNICAL FIELD

This invention relates to diesel engine fuel ignition and more particularly to an injection igniter system which creates a fuel conditioning spark between an injection needle valve and its valve seat upon initial injection of fuel into an engine cylinder to reduce ignition lag.

BACKGROUND OF THE INVENTION

In a diesel engine, the combustion event is controlled by many factors. Two of these which are fundamental to the process are the compression temperature of the charge and the point at which the fuel is injected. A problem with compression ignition of the fuel in the compressed air charge is that a substantial time lag exists between the initial entry of fuel into the cylinder and the beginning of combustion. This phenomenon, called ignition lag, causes increased levels of NOx to be generated. Also, because of the hammer-like effect caused by the accumulated fuel burning nearly all at once, the engine components must be designed to be more robust than for other engines.

Over the years there have been attempts to reduce the problem of unburned fuel collection prior to compression ignition of the charge. Three of the methods that have been developed are pilot injection, rate shaping and pre-chambers. In pilot injection, a small amount of fuel is first injected into the cylinder prior to the main charge in hope that the pilot charge will start to burn just before the main charge of fuel is injected, thus providing for prompt ignition of the main charge without significant delay. Rate shaping attempts a similar result by initially injecting fuel at a slower rate and increasing the fuel injection rate at a time when the earlier injected fuel has been ignited. In pre-chamber engines, a small amount of fuel is injected into a separate chamber where it is ignited and then causes a jet of burning fuel to be forced into the main combustion chamber to ignite the main charge of fuel. While these methods have their advantages in reducing cylinder pressures and moderating engine structural requirements, they also have disadvantages in control of regulated emissions from the combustion process which make desirable a search for improved ways of accomplishing the reduction of ignition lag in diesel engines.

SUMMARY OF THE INVENTION

The present invention proposes to reduce the fuel collection problem in a completely different manner. The essence of the concept is to supply enough energy at the point of initial fuel entry into the cylinder that the fuel is placed in condition for immediate ignition in the compressed air charge of the engine cylinder. There are many ways in which this energy could be supplied including, for example, laser beam, induction, microwave, AC spark, DC spark, radiation, resistance heating, chemical reactions, etc. In the presently preferred embodiment, the selected method is by creating a spark or electrical discharge at the point of initial fuel entry into the cylinder so that the fuel is conditioned by the spark energy to be ready for compression ignition upon entry into the cylinder.

To provide means for spark conditioning of the injected fuel with a minimum of modification of conventional diesel engine components, the present invention provides a diesel igniter injector or igniter fuel nozzle. The igniter nozzle is constructed so that an electrical charge may be imposed between the injection valve seat in the injector nozzle tip and the injection valve which seats upon the valve seat and is opened to allow fuel to be injected. The injection valve and associated moving components, such as a biasing spring, are preferably insulated from the body of the injector or fuel nozzle and are connected electrically with an external source of electrical energy. The electrical system is arranged such that, upon lifting of the injection valve off the valve seat, the electrical charge between the valve and the associated nozzle creates a spark, or electrical discharge arc, between the tip of the injection valve and the valve seat, between which the fuel is passing as it is injected. The electrical discharge across this gap is believed to cause fuel cracking, ionization and heating, all of which condition the fuel such that upon entry into the cylinder it will be ignited quickly with little or no ignition lag. Thus, as additional fuel is injected into the cylinder, it will begin its combustion event, and a rapid rise in cylinder pressure beyond that caused by the rate of fuel injection will be avoided. Also, combustion will be better controlled and reduction in undesirable emissions such as NOx can be expected.

These and other features and advantages of the invention will be more fully understood from the following description of certain specific embodiments of the invention taken together with the accompanying drawings.

BRIEF DESCRIPTION OF THE DRAWINGS

FIG. 1 is a cross-sectional view of a diesel engine fuel injector, or fuel nozzle, having an electrically-insulated injection valve and spring, together with conducting means for applying an electrical discharge at the nozzle tip in accordance with the invention; and FIG. 2 is a schematic diagram showing a simplified form of electrical igniter circuit for use with the igniter nozzle of FIG. 1.

DESCRIPTION OF THE PREFERRED EMBODIMENT

Referring first to FIG. 1 of the drawings, numeral 10 generally indicates a nozzle assembly forming part of a diesel engine injector or injection system. Assembly 10 includes a main body 12 supporting an injection nozzle 14 and associated with a hold down clamp or crab 15 for holding the nozzle assembly in a nozzle opening of an associated engine cylinder head, not shown. While the form of injection nozzle assembly illustrated is intended for use with an injection system having a separately mounted injection pump connected with the nozzle assembly by a high pressure fuel line, the operating portions of the fuel nozzle assembly to be described are such as could be equally well utilized in other types of injection nozzles and in self-contained fuel injectors which incorporate both a fuel injection pump and an integral fuel injection nozzle assembly.

Nozzle assembly 10 is similar to one form of prior fuel injection nozzle in that the main body 12 includes a recess 16 open to the lower end and containing a valve spring 18 having upper and lower spring seats 20, 22. The lower spring seat is biased by the spring against the upper end of an injection valve in the form of a needle valve 24 that is reciprocably mounted in a bore within the injection nozzle 14. The lower end or tip 26 of the needle valve is generally conical and normally seats on a conical valve seat 28, below which multiple spray orifices 30 are provided. A spacer 32 separates the injection nozzle from the main body, and the spacer and injection nozzle elements are held to the main body by an assembly nut 34. A high pressure fuel passage 36 extends from an opening in the upper end of the body to one side of and through the body longitudinally, continuing through the spacer and into the injection nozzle 14 where it terminates at an enlarged chamber 37 surrounding a central portion of the needle valve. The separate portions of the fuel passage 34 are kept in alignment by dowels 38, 39 extending between the spacer 32 and the injection nozzle 14 on the lower side and between the spacer and the main body 12 on the upper side. A return fuel passage 40 also extends from the upper end of the spring recess 16 to an outlet opening 42 in the body 12.

In operation of these conventional portions of the fuel nozzle assembly, high pressure fuel is delivered through passage 36 to the chamber 37 surrounding the needle valve 24. When injection of fuel is required, a separate pump increases the fuel pressure in passage 36 and hydraulically actuates the needle valve against the bias of spring 18 to open the valve and allow fuel from the chamber 37 to pass down through clearance, not shown, to the valve seat 28 where the fuel is sprayed out through the orifices 30 into an associated engine cylinder. Upon cut off of the high fuel pressure, the injection valve 24 is returned to the valve seat 28, shutting off fuel flow. Fuel which leaks past the close clearance between the upper portion of the needle valve 24 to the nozzle 14 enters the spring recess 16 in the main body and passes out through the return passage 40 and outlet opening 42 to a return line, not shown, in the fuel system.

In accordance with the invention, conventional portions of the fuel nozzle just described are modified to incorporate a spark igniter 44 as a portion of the fuel injection nozzle assembly 10. These modifications include insulating the needle valve 24 and spring 18 from the remainder of the main body 12 and the injection nozzle 14. In the disclosed embodiment, this is accomplished by making the spacer 32 and the upper spring seat 20 of electrically insulating ceramic materials. Additionally, tubular ceramic 46 may be provided in the spring recess 16 surrounding the spring and separating it from the body 12. In the injection nozzle 14, ceramic materials 48 are used between the needle valve 24 and the inner walls of the injection nozzle 14 to insulate the injection valve 24 from the nozzle. However, the conical tip of the injection valve 24 where it seats on the conical seat of the injection nozzle is not insulated, but allows electrical communication between the needle valve and the nozzle at the valve seat 28. Additionally, an insulated power wire 50 is fed through the outlet opening 42 and return fuel passage 40 to the spring recess 16 in the body 12 where the wire is electrically connected with a stationary end of the spring 18.

Operation of the modified nozzle assembly is as follows. A source of electrical energy, such as an induction coil, is connected to an outer end of the power wire 50. The circuit is completed by grounding the main body, or the nut 36, of the nozzle assembly 10 to an associated cylinder head of the engine, not shown. When the injector is hydraulically actuated, electrical energy fed through the wire 50 to the spring 18 and through the spring to the needle valve 24 is conducted from the needle valve 24 to the associated nozzle valve seat 28.

As the needle 24 lifts and fuel begins to pass out through the orifices 30, the movement of the needle away from the valve seat 28 initiates an electrical discharge or spark between the needle 24 and the valve seat. The initially injected fuel passes through the electrical discharge and is conditioned, such as by fuel cracking, ionization and heating. This results in preparing the fuel for essentially immediate ignition upon entering the compressed air charge in the cylinder, so that ignition lag is completely or largely eliminated and ignition starts almost immediately upon injection of fuel. The initial burning mass of fuel then continues to ignite the fuel subsequently injected or, as the result of increasing the temperature, compression ignition of the fuel occurs immediately. The result is that ignition lag is essentially avoided or overcome and burning of the fuel proceeds at a more moderate rate based upon the rate of fuel injection established for the injector. Thus, cylinder pressures and temperatures are moderated and NOx emissions are substantially reduced, while the required structural strength of the cylinder structure is comparably lessened.

Any suitable source of electric energy may be utilized for creating the spark ignition or spark conditioning aspects of the electrical discharge within the fuel injector nozzle. FIG. 2 illustrates one form of electrical igniter circuit 52 for use in developing the power required for actuating such an injection system. Igniter circuit 52 includes a battery 54, or other source of DC electrical energy. A negative pole of the battery is connected through a switch 56 with a ground point 58 of the circuit to the engine frame. A positive pole of the battery is connected to an induction coil 60 which is in turn connected through the igniter formed by the nozzle assembly 10 to the ground point 58 by connection of the main body 12 or the assembly nut 36 with the engine cylinder head.

In operation, when the switch 56 is closed and the igniter points 10 are closed by seating of the needle valve 24 on the valve seat 28, current flows through the circuit 52 to build up inductive energy in the coil 60. When the injection (needle) valve 24 is actuated and is lifted off its seat 28 to begin fuel flow, the circuit is interrupted and the induction coil 60 discharges. This causes an arc discharge across the igniter points, that is, between the tip of the needle valve 24 and the adjacent valve seat 28, through which the initially injected fuel passes and is conditioned for immediate ignition upon entering the cylinder. The use of the switch 56 is optional, depending upon the supply of energy and the need for cutting off electric flow between ignition events in the cylinder. Thus, if desired, the switch 56 could be eliminated so that whenever the engine is in operation, the circuit 52 will have current flow through the system except when the igniter points are separated and an arc discharge occurs as the circuit is broken.

The present invention also contemplates other methods and means for supplying energy to condition fuel for immediate ignition upon injection into an engine cylinder. These include laser heating, induction heating, microwave heating, radiation, resistance heating, chemical heating and other known heating methods and apparatus that may be applied to or adjacent an injector nozzle. Such concepts should therefore be considered within the scope of the invention as disclosed.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A fuel injector for a diesel engine, said injector comprising:
a nozzle body including an orificed tip with an internal valve seat and a fuel passage leading to the valve seat;
an injection valve reciprocable in the nozzle body and seatable on the valve seat to stop fuel flow through the orificed tip, the injection valve being openable for injecting fuel through the orificed tip into an associated cylinder; and conditioning means adapted for supplying substantial energy to the fuel immediately prior to injection through the tip;

whereby the fuel is conditioned for ignition without substantial ignition lag upon injection into air compressed to ignition temperature in a cylinder.

2. A fuel injector for a diesel engine, said injector comprising:

an electrically-conductive nozzle body including an orificed tip with an internal valve seat and a fuel passage leading to the valve seat, the body being connectible to one side of an igniter system;

an electrically-conductive injection valve reciprocable in the nozzle body and seatable on the valve seat to stop fuel flow through the orificed tip, the injection valve being electrically insulated from the body except at its contact with the valve seat; and conductor means for conducting an electrical charge to the injection valve during opening of the valve;

whereby an electrical spark discharge is generated between the injection valve and the valve seat upon opening of the valve.

3. A fuel injector as in claim 2 wherein said injector comprises an igniter nozzle.

4. A fuel injector as in claim 2 wherein said injection valve is a needle valve that is biased toward closing by a spring, the spring being electrically conductive, insulated from the body and electrically connecting the needle valve with the electrical charge applying means.

5. An igniter system for a diesel engine, said system comprising:

a fuel injector as in claim 1; and an electrical charging source connected to said conductor means for applying a voltage across the injection valve and the valve seat.

6. A system as in claim 5 wherein said charging source is an igniter circuit.

7. A method for reducing ignition lag in diesel engines comprising:

providing the engine with a fuel injection nozzle including a fuel supply and having a valve seat and an injection valve seatable on the valve seat to close the nozzle to fuel flow, the valve being openable to permit fuel flow between the valve and seat;

providing fuel conditioning energy supply means adjacent the valve seat to supply conditioning energy to fuel injected when the valve is opened; and operating the injection nozzle in the engine to supply energy to the injected fuel upon opening of the valve, thereby conditioning the fuel for essentially immediate compression ignition upon entry into a compressed air charge of an associated engine cylinder, thus reducing ignition lag of the diesel fuel combustion process.

8. A method for reducing ignition lag in diesel engines comprising:

providing the engine with a fuel injection nozzle including a fuel supply and having an electrically-conductive valve seat and an electrically-conductive injection valve seatable on the valve seat to close the nozzle to fuel flow, the valve being openable to permit fuel flow between the valve and seat;

electrically connecting the valve and seat in an electrical circuit having means to cause an electrical discharge between the valve and seat when the valve is opened; and operating the injection nozzle in the engine to cause an electrical discharge through the fuel passing between the valve and seat upon opening of the valve, thereby conditioning the fuel for essentially immediate compression ignition upon entry into a compressed air charge of an associated engine cylinder, thus reducing ignition lag of the diesel fuel combustion process.

* * * * *